United States Patent
Zhou et al.

(10) Patent No.: US 7,640,430 B2
(45) Date of Patent: Dec. 29, 2009

(54) SYSTEM AND METHOD FOR ACHIEVING MACHINE AUTHENTICATION WITHOUT MAINTAINING ADDITIONAL CREDENTIALS

(75) Inventors: Hao Zhou, Solon, OH (US); Joseph Salowey, Seattle, WA (US); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 421 days.

(21) Appl. No.: 11/098,637

(22) Filed: Apr. 4, 2005

(65) Prior Publication Data

US 2006/0224890 A1    Oct. 5, 2006

(51) Int. Cl.
*H04L 9/32* (2006.01)
(52) U.S. Cl. ......................................... 713/170; 726/10
(58) Field of Classification Search .................. 713/170; 726/5
See application file for complete search history.

(56) References Cited

U.S. PATENT DOCUMENTS

| | | | |
|---|---|---|---|
| 5,757,920 A * | 5/1998 | Misra et al. .................. | 713/158 |
| 6,088,451 A * | 7/2000 | He et al. ........................ | 726/8 |
| 6,189,100 B1 * | 2/2001 | Barr et al. .................... | 713/182 |
| 7,257,836 B1 * | 8/2007 | Moore et al. .................... | 726/5 |
| 2003/0172269 A1 * | 9/2003 | Newcombe .................. | 713/168 |
| 2005/0210252 A1 * | 9/2005 | Freeman et al. ............. | 713/171 |

OTHER PUBLICATIONS

Dierks et al. The TLS Protocol Version 1.0, Jan. 1999, Network Working Group, Request for Comments 2246, pp. 42.*

* cited by examiner

*Primary Examiner*—Gilberto Barron, Jr.
*Assistant Examiner*—Virginia Ho
(74) *Attorney, Agent, or Firm*—Tucker Ellis & West LLP

(57) ABSTRACT

A Machine Authentication PAC (Protected Access Credential) serves as machine credentials to obtain network access without requiring server storage and management of the additional set of credentials. The first time authentication is performed, user authentication is executed. After the supplicant and server have mutually authenticated each other and satisfied other validations, the supplicant requests a Machine Authentication PAC from the server. The Server randomly generates a cryptographic key (Device Key) and sends it to the supplicant along with an encrypted ticket, comprising the Device Key and other information and encrypted with a key only known to the Server. The supplicant caches the Machine Authentication PAC in its non-volatile memory for future use. When the machine needs to access certain network services before a user is available, the supplicant uses the Machine Authentication PAC to gain authorization for the machine to limited access on the network, without requiring user input.

12 Claims, 3 Drawing Sheets

SYSTEM AND METHOD FOR ACHIEVING MACHINE AUTHENTICATION WITHOUT MAINTAINING ADDITIONAL CREDENTIALS

BACKGROUND OF THE INVENTION

The present invention relates generally to IEEE 802.1x (The Institute of Electrical and Electronic Engineer's 802.1x standard) requires endpoint device authentication before enabling connection to the network port. This usually causes problems while a host is starting up and users cannot be prompted for their credentials for authentication during that time. As a result, the host may not be allowed on the network and have access to network services needed for user and machine domain logging in. An example of network services affected is Microsoft networking and active directory group policy assignment.

One approach to solve this problem is using an additional set of credentials to obtain network access for the machine before the user logs in. This is usually referred to as "Machine Authentication". This is problematic because the server validating network access policy must have access to and manage the additional credentials. The problem is made worse if multiple vendors provide supplicants on the same machine and some vendors don't allow access to their machine credentials. Some supplicant vendors tried to workaround the problem by storing another set of credentials specifically for machine authentication, which inadvertently creates a problem for servers to manage and synchronize the additional set of credentials.

BRIEF SUMMARY OF THE INVENTION

In accordance with an aspect of the present invention, the first time authentication is performed a user authentication is executed. The user authentication is based on information held by the user and accessible by an Authentication Server (e.g., Authentication Authorization Accounting "AAA" server such as a RADIUS server). During a successful authentication, a security association, for example a secure tunnel, is established from the supplicant to the authentication server. An authenticator forwards the secure traffic from the authentication server to the supplicant and vice versa.

A cryptographic key (Device Key) is randomly generated by the server and sent to the supplicant at request of the supplicant after authentication and any other validation takes place. Along with this key an encrypted ticket is sent. This ticket is encrypted in a key (Server Key) that only the authentication server knows. Then encrypted material contains the randomly generated key and information to identify that this key has been issued to represent a valid machine and with an expiration time. The information that is represented in the ticket represents the machine and does not contain specific user information. The supplicant caches this key and ticket.

When the machine needs to access certain network services before a user is available, the supplicant may use the device key and ticket to gain authorization for the machine to limited access on the network, without requiring user input. The supplicant sends the encrypted ticket to the server and uses the device key to authenticate itself to the server using standard pre-shared key authentication exchanges. In order to validate the credential the authentication server needs to decrypt the ticket, validate the machine base on machine identity and expiry time, and the supplicant has the correct Device key. However, the authentication server does not need to maintain the per machine state about the supplicant on the server. The Authentication Server may store the ticket locally or in an external repository for tracking and revocation purposes. This stored state does not need to be referenced during authentication but is rather used during administrative time functions.

Since the ticket does not contain user information, the access given as a result of presenting this credentials will likely be less than that being given to an authorized user. The expectation is that the machine is given access to the services it needs before a user is accessing the system. Based on authentication server policy, limited network access can be granted with the use of machine ticket only, such as access to the DHCP server, domain controllers, etc. This might limit potential exposure to attacks as the machine authentication only validates the cached machine credentials instead of the prompted user credentials. Once user has successfully logged in, another complete user authentication will occur, upon which full (or appropriate for the user) network access can be granted after a successful user authentication.

The present invention also includes a system and computer readable medium for performing the methods described herein.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
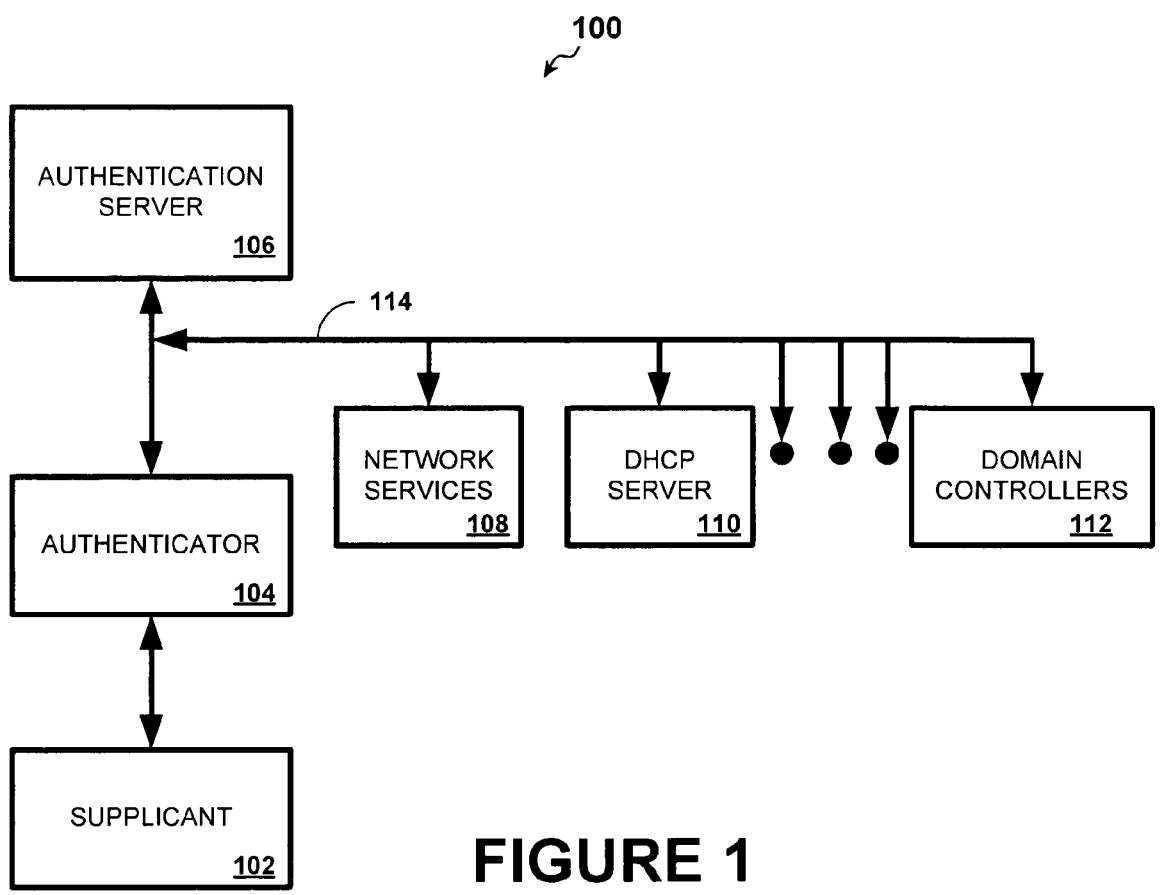
FIG. 1 is a block diagram of a system in accordance with an aspect of the present invention.

Throughout this description, the preferred embodiment and examples shown should be considered as exemplars, rather than limitations, of the present invention. The present invention is directed to a system and method for achieving machine authentication without an authentication server maintaining an additional set of credentials. An aspect of the present invention contemplates a Machine Authentication PAC (Protected Access Credential), to serve as machine credentials to obtain network access but without requiring server storage and management of the additional set of credentials.

The first time authentication is performed, user authentication is executed. This authentication is based on information held by a user and accessible by the authentication server. The user may be prompted for his credentials.

During the first authentication, a security association is established from the supplicant to the authentication server. After the supplicant and server have mutually authenticated each other and satisfied other validations, the supplicant requests a Machine Authentication PAC from the server. The Server randomly generates a (cryptographic) device key and sends the device key to the supplicant along with an encrypted ticket protected under the security association established during the first authentication. Preferably, the ticket is encrypted in a key that only the authentication server knows. The encrypted ticket comprises the randomly generated device key and information to identify that this key has been issued to represent a valid machine. In a preferred embodiment the device key has an expiration time, which may also be included in the encrypted ticket. The device key and encrypted ticket forms the Machine Authentication PAC. In a preferred embodiment, each Machine Authentication PAC includes the identifier for the server issuing the PAC, expiration times, and a machine identifier obtained from the supplicant's request.

The supplicant caches the Machine Authentication PAC in its non-volatile memory for future use. The supplicant stores the Machine Authentication PAC under the machine account, accessible by an account with the local machine account privilege and not accessible by any user. The supplicant module can pick its own encryption and protection scheme for the Machine Authentication PAC. This Machine Authentication PAC is provided for that particular machine, thus it is global and can be used whenever no user context is available, e.g., before a user has logged in.

When the machine needs to access certain network services before a user is available, the supplicant may use the Machine Authentication PAC to gain authorization for the machine to limited access on the network, without requiring user input. The supplicant sends the encrypted ticket to the server and uses the Device key to authenticate itself to the server in standard pre-shared key authentication exchanges. In order to validate the credential the authentication server decrypts the encrypted ticket, validates the machine based on the machine identity and expiration time, and the supplicant has the right Device key. However, the authentication server does not need to maintain the per machine state or per machine credentials on the server, it only needs the server key to encrypt and decrypt the ticket.

An aspect of the present invention is that based on the authentication (e.g., AAA) server policy, limited network access can be granted with the use of Machine Authentication PAC only. The network access can be limited to only servers that are required by the domain logging in, e.g, DHCP servers, domain controllers, etc. This limits potential exposure to attacks as the machine authentication only validates the cached machine credentials instead of the prompted user credentials. Once a user has successfully logged in, another complete user authentication will occur, upon which full network access (or appropriate access for the user) can be granted after a successful user authentication.

An aspect of the present invention is that no interruption of network services occurs before a user logs in, while IEEE 802.1x port control is being used. Users will not lose existing network features and suffer from loss of security and bad user experience.

Another aspect of the present invention is that users are not prompted for another set of credentials to establish network connection before logging in. The supplicant is not required to access proprietary or vendor specific (e.g., Microsoft) storage for machine credentials.

Still another aspect of the present invention is that AAA or policy servers are relieved from maintaining another set of credentials and problems associated with it. They just need to maintain a set of master key to encrypt and decrypt the Machine Authentication PAC.

Yet another aspect of the present invention is that the new Machine Authentication PAC can be automatically provisioned and updated as part of the authentication process. If the authentication server detects the Machine Authentication PAC being used is or close to be expired, it can update and refresh the Machine Authentication PAC within the normal authentication process by sending updated Machine Authentication PAC at the end of authentication.

The Machine Authentication PAC is a form of the credentials independent of the EAP (Extensible Authentication Protocol) method. Depending on the EAP-Method being used for authentication, the Machine Authentication PAC can be used differently to authenticate the machine. The device key can be used as the shared secret between the supplicant and authentication server, provided the encrypted ticket will be sent to the server during the process so the server can retrieve the device key from the encrypted ticket. Then the supplicant and the server can use standard challenge and response mechanism to mutually authenticate each other, e.g., Transport Layer Security (TLS) handshake using pre-shared key ciphersuites. Alternatively, other pre-shared key methods, such as EAP-FAST may be used to mutually authenticate the peer and the authentication server using the Machine Authentication PAC. The Machine PAC is global to the users on the machine. Once provisioned to the machine, the Machine PAC can be used when no user credentials is available, e.g., before any user has logged on the machine or after a user has logged off the machine. However, once a user has logged onto the machine, then the user's credentials are used for accessing the network.

Referring to FIG. 1, there is described herein a system 100 configured in accordance with an aspect of the present invention. Supplicant 102 communicates bi-directionally with authenticator 104. Authenticator 104 comprises logic for limiting supplicant 102's access to network 100 based on its current context, e.g., logged in, not logged in, authenticating, etc. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Authenticator 104 communicates bi-directionally with authentication server 106. Before supplicant 102 has been authenticated, authenticator 104 limits communication from supplicant 102 to exchanging authentication communications with authentication server 106.

In accordance with an aspect of the present invention, supplicant 102 comprises logic for authenticating with authentication server 106. The first time authentication is performed, logic in supplicant 102 performs a user authentication. The user authentication is based on information held by a user associated with the machine that is accessible by authentication server 106. During authentication, a security association (not shown) is established from supplicant 102 to authentication server 106. After supplicant 102 and authentication server 106 have mutually authenticated each other and have satisfied any other validations for network 100, supplicant 102 requests a Machine Authentication Protected Access Credential (PAC) from authentication server 106. Authentication server 106 comprises logic to randomly generate a (cryptographic) device key and send it to supplicant 102 along with an encrypted ticket protected by the security association established by the first authentication. The encrypted ticket is encrypted with a key that only authentication server 106 knows. In a preferred embodiment, the encrypted material contains the randomly generated device (cryptographic) key and information to identify that this key has been issued to represent a valid machine. In a preferred embodiment, the encrypted material contains material indicating an expiration time for the key. Because the encrypted ticket is encrypted by a key only authentication server 106 knows and contains information indicating the key has been issued to a valid machine, authentication server 106 does not need to maintain an extra set of credentials for the machine. In a preferred embodiment, the device key and encrypted ticket forms Machine Authentication PAC. Each Machine Authentication PAC includes the identifier for the authentication server, (authentication server 106 in this example) that issued the Machine Authentication PAC, expiration times, and a machine identifier for the machine (the supplicant 102 is attached to in this example) received in the request for the Machine Authentication PAC.

Supplicant 102 comprises logic that caches the Machine Authentication PAC in its non-volatile memory for future use. In a preferred embodiment, supplicant 102 stores the Machine Authentication PAC under the machine account, accessible by an account with a local machine account privilege and not accessible by any user or user account. Supplicant 102 further comprises logic that selects its own encryption and protection scheme for the Machine Authentication PAC. The Machine Authentication PAC is provided for a particular machine (attached to supplicant 102 in this example), and therefore, is global and can be used whenever no user context is available (e.g., before a user has logged in).

When the machine (attached to supplicant 102) needs to access certain network services before a user is available, for example network services 108 (which for example may store software updates for the machine) DHCP server 110 or domain controllers 112, supplicant 102 employs the Machine Authentication PAC to gain authorization for the machine to obtain limited access on the network without requiring user input. Supplicant 102 sends the encrypted ticket to authentication server 106. In order to validate supplicant 102, authentication server 106 decrypts the encrypted ticket to validate the machine based on the machine identity and expiration time. However, authentication server 106 does not need to maintain the per machine state or per machine crederitials on the server. In a preferred embodiment authentication server 106 may initiate additional communication to determine whether supplicant 102 knows the device key to validate supplicant 102, e.g., challenge and response.

Based on authentication server 106 policy, limited network access can be granted to supplicant 102 by authenticating with the Machine Authentication PAC. The network access can be limited to servers that are required by domain logging, e.g., DHCP servers, such as DHCP server 110, domain controllers 112, network services 108, etc. This aspect of the present invention can limit potential exposure to attacks as the machine authentication only validates cached machine credentials instead of the prompted user credentials. Once a user has successfully logged in, another compete user authentication will occur, upon which full (or appropriate for the user) network access can be granted after a successful user authentication.

Figure 2:
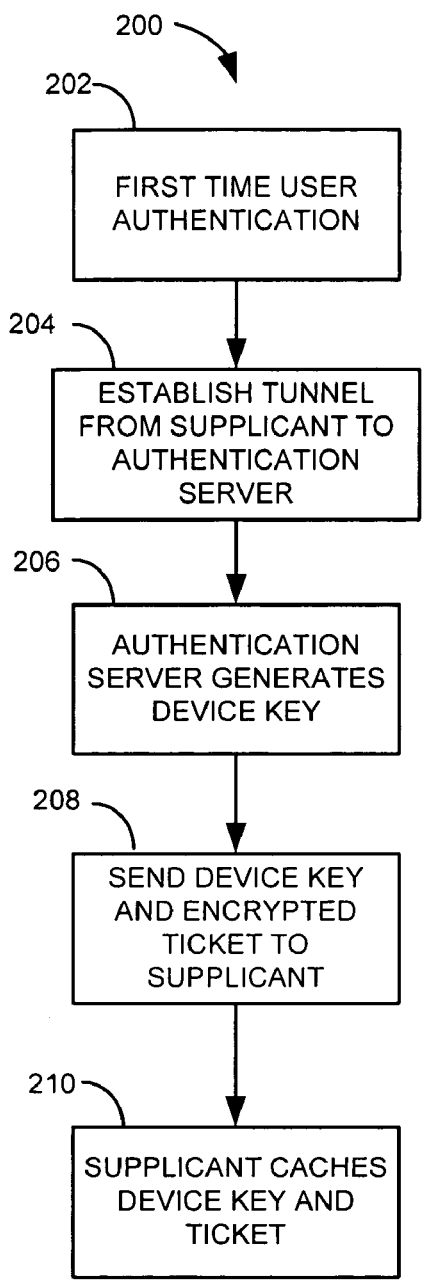
FIG. 2 is a block diagram of a methodology performed during a first user authentication for a machine in accordance with an aspect of the present invention.
Figure 3:
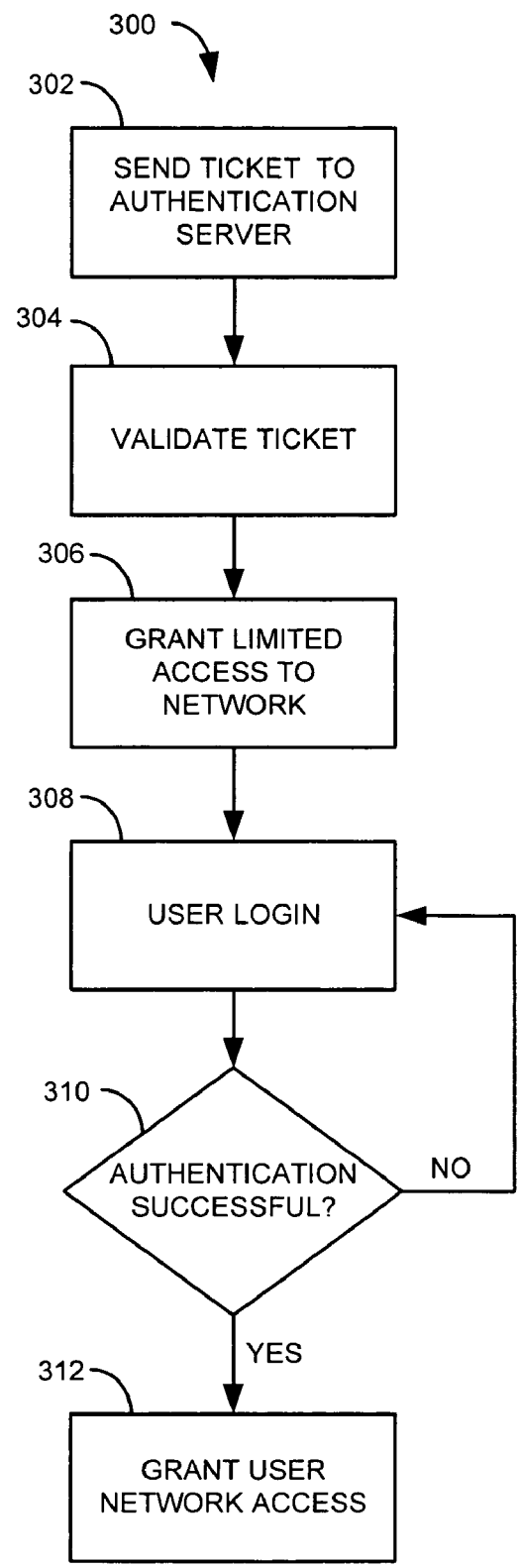
FIG. 3 is a block diagram of a methodology for performing subsequent authentications for the machine in accordance with an aspect of the present invention.

In view of the foregoing structural and functional features described above, a methodology in accordance with various aspects of the present invention will be better appreciated with reference to FIGS. 2 and 3. While, for purposes of simplicity of explanation, the methodology of FIGS. 2 and 3 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 2 is a block diagram of a methodology 200 performed during a first user authentication for a machine in accordance with an aspect of the present invention. At 202, the first time authentication is performed. This authentication is based on information held by the user and accessible by the authentication server. User may be prompted for his credentials. During the authentication process, at 204 a security association is established from the supplicant to the authentication server. The supplicant requests a Machine Authentication PAC protected by the security association.

At 206, responsive to the request for Machine Authentication PAC, the authentication server randomly generates a device key (e.g., a cryptographic key). At 208, the authentication server sends the device key and an encrypted ticket to the supplicant using the security association. The encrypted ticket contains the randomly generated device key and information to identify that the key has been issued to represent a valid machine, and preferably has an expiration time. The device key and the encrypted ticket form the Machine Authentication PAC. The Machine Authentication PAC comprises an identifier for the server issuing the Machine Authentication PAC, expiration times, and the machine identifier obtained from the request for the Machine Authentication PAC. The server may log the issued ticket locally or in an external server for administrative operation such as tracking or revocation.

At 210, the supplicant caches the Machine Authentication PAC, which comprises the device key and the encrypted ticket, in its non-volatile memory for future use. The supplicant stores the Machine Authentication PAC under a machine account available to an account with local machine account privilege, but not to any user account. The supplicant can select its own encryption and protection scheme for the Machine Authentication PAC. The Machine Authentication PAC is dedicated to a particular machine, thus it is global and can be used whenever no user context is available, e.g., before a user has logged in.

Referring now to FIG. 3, there is illustrated a block diagram of a methodology 300 for performing a subsequent authentication for the machine in accordance with an aspect of the present invention. Methodology 300 can be employed anytime after the machine has received its Machine Authentication PAC, such as during a subsequent booting up of the machine. When the machine needs to access certain services before a user is available, at 302 it sends the encrypted ticket from the Machine Authentication PAC to the authentication server.

At 304, the encrypted ticket is validated. The authentication server validates the ticket with a private key known only to the authentication server. The authentication may determine the device key from the encrypted ticket, an expiration time for the key, and the machine identifier. Optionally, the validation process may perform additional validity checks on the ticket or the ticket contents, such as a revocation check. A revocation check determines whether a previously issued valid device key or ticket has been revoked. Furthermore, the authentication server may initiate an exchange, such as a challenge and response, to determine whether the machine knows the correct device key.

At 308, limited access is granted based on information derived from the Machine Authentication PAC. The network access can be limited to only servers that are required for domain logging in, e.g., DHCP servers, domain controllers, etc.

At 310, user login is initiated. If the user authentication is successful (YES), then the access for the machine is changed from the machine access to the user access. However, if the user authentication is unsuccessful (NO), then the user login process at 308 is repeated. However, in systems that limit the number of login attempts allowed, after exceeding the number of times login attempts the process can abort (not shown).

Figure 4:
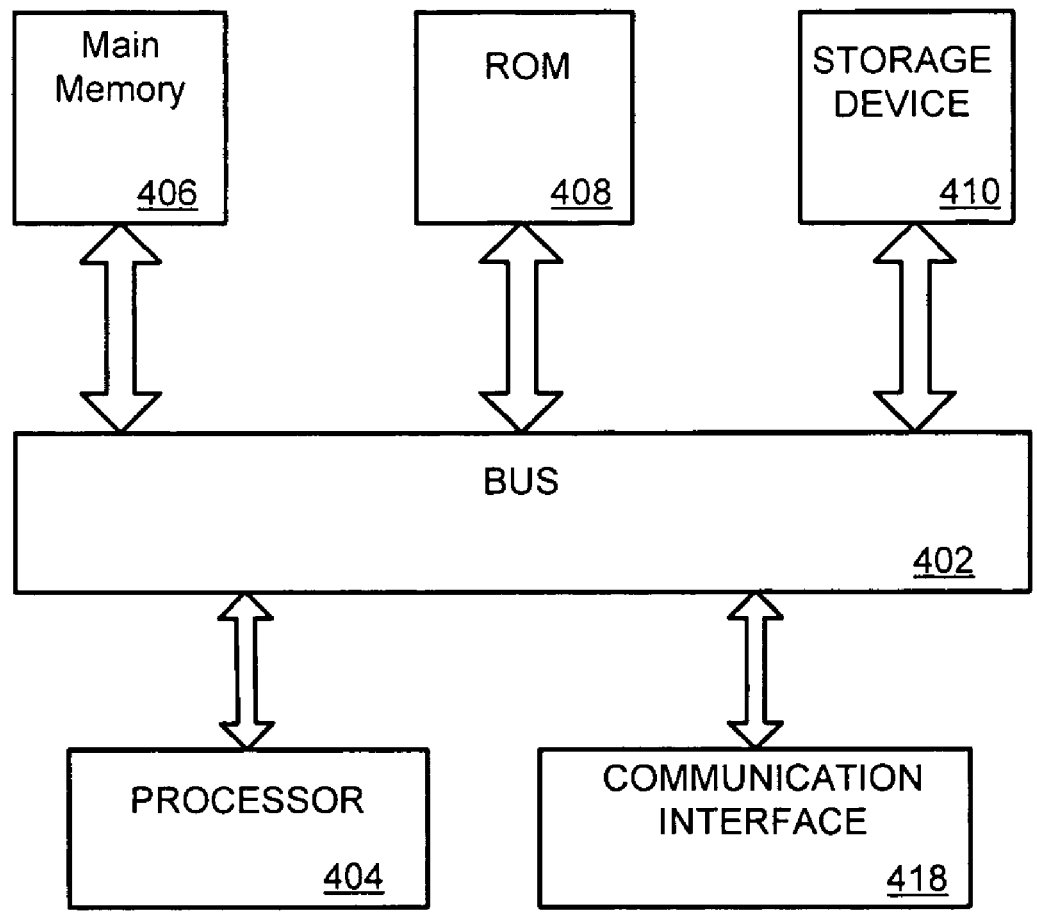
FIG. 4 is a block diagram of a computer system adaptable to perform aspects of the present invention.

FIG. 4 is a block diagram that illustrates a computer system 400 upon which an embodiment of the invention may be implemented. Computer system 400 is suitably adaptable to be employed by at least one of supplicant 102, authenticator 104, authentication server 106, network services 108, DHCP server 110 and domain controllers 112 in FIG. 1. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variable or other intermediate information during execution of instructions to be executed by processor 404. Computer system 400 further includes a ready only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 400 for machine authentication. According to one embodiment of the invention, machine authentication is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and place the data on bus 402. Bus 402 carries the data to main memory 406 from which processor 404 retrieves and executes the instructions. The instructions received by main memory 406 may optionally be stored on storage device 410 either before or after execution by processor 404.

The received code may be executed by processor 404 as it is received, and/or stored in storage device 410, or other non-volatile storage for later execution. In this manner, computer system 400 may obtain application code in the form of a carrier wave.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for an authentication server to authenticate a supplicant, comprising:
    authenticating an associated user with the supplicant;
    establishing a protected session with the associated user;
    generating a device key for the supplicant;
    generating an encrypted ticket comprising the device key for the supplicant and information representing the supplicant, the encrypted ticket encrypted with a key only known to the authentication server;
    sending a machine authentication protected access credential comprising the device key and the encrypted ticket to the supplicant responsive to the authenticating an associated user with the supplicant;
    receiving an encrypted ticket during a subsequent authentication request;
    extracting a device key from the encrypted ticket received during the subsequent authentication request using the key only known to the authentication server;
    verifying the supplicant possesses the device key extracted from the encrypted ticket; and
    granting limited access to the network responsive to verifying the supplicant possesses the device key extracted from the encrypted ticket.

2. A method according to claim 1, further comprising encrypting the ticket with encryption an algorithm and a key known only to the authentication server.

3. A method according to claim 1, wherein the encrypted ticket comprises information representative of the machine authentication protected access credential.

4. A method according to claim 3, wherein the encrypted ticket comprises an expiration time for the machine authentication protected access credential.

5. A method according to claim 1, further comprising:
validating the encrypted ticket with a private key of the authentication server.

6. A method according to claim 1, further comprising:
receiving a subsequent user authentication after the subsequent authentication request;
granting access to the network based on a user credential associated with the user authentication.

7. An apparatus, comprising:
an authentication server configured to authenticate an associated user with the supplicant;
wherein the authentication server is configured to establish a protected session with the associated user;
wherein the authentication server is configured to generate a device key for the supplicant;
wherein the authentication server is configured to generate an encrypted ticket comprising the device key for the supplicant and information representing the supplicant, the encrypted ticket encrypted with a key only known to the authentication server;
wherein the authentication server is configured to send a machine authentication protected access credential comprising the device key and the encrypted ticket to the supplicant responsive to the authenticating an associated user with the supplicant;
wherein the authentication server is configured to receive an encrypted ticket during a subsequent authentication request;
wherein the authentication server is configured to extract a device key from the encrypted ticket received during the subsequent authentication request using the key only known to the authentication server;
wherein the authentication server is configured to verify the supplicant possesses the device key extracted from the encrypted ticket; and
wherein the authentication server is configured to grant limited access to the network responsive to verifying the supplicant possesses the device key extracted from the encrypted ticket.

8. An apparatus according to claim 7, further comprising the authentication server is configured to encrypt the ticket with an encryption algorithm and a key known only to the authentication server.

9. An apparatus according to claim 7, wherein the encrypted ticket comprises information representative of the machine authentication protected access credential.

10. An apparatus according to claim 9, wherein the encrypted ticket comprises an expiration time for the machine authentication protected access credential.

11. An apparatus according to claim 7, the authentication server is further configured to validate the encrypted ticket with a private key of the authentication server.

12. An apparatus according to claim 7, further comprising:
the authentication server is further configured to receive a subsequent user authentication after the subsequent authentication request; and
the authentication server is further configured to grant access to the network based on a user credential associated with the user authentication.

* * * * *

UNITED STATES PATENT AND TRADEMARK OFFICE
CERTIFICATE OF CORRECTION

PATENT NO. : 7,640,430 B2  Page 1 of 1
APPLICATION NO. : 11/098637
DATED : December 29, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,430 B2 | |
| APPLICATION NO. | : 11/098637 | |
| DATED | : December 29, 2009 | |
| INVENTOR(S) | : Hao Zhou et al. | |

It is certified that error appears in the above-identified patent and that said Letters Patent is hereby corrected as shown below:

In claim 2, Column 8, line 66, please replace "encrypting the ticket with encryption an algorithm and a" with --encrypting the ticket with an encryption algorithm and a--.

Signed and Sealed this
Fifteenth Day of February, 2011

David J. Kappos
*Director of the United States Patent and Trademark Office*